United States Patent Office 2,915,398
Patented Dec. 1, 1959

2,915,398

β,δ-DIHYDROXY-β-METHYLVALERIC AND DERIVATIVES THEREOF AS GROWTH PROMOTERS

Lemuel D. Wright, Whitpain Township, Montgomery County, and Helen R. Skeggs, Abington Township, Montgomery County, Pa., and Donald E. Wolf, Franklin Township, Somerset County, and Carl H. Hoffman, Scotch Plains, N.J., assignors to Merck & Co., Inc., Rahway, N.J., a corporation of New Jersey No Drawing. Application November 30, 1955
Serial No. 550,166
9 Claims. (Cl. 99—2)

This invention relates to β,δ-dihydroxy-β-methylvaleric acid, to the lactone of such acid, and to amides and salts of such acid.

Minute quantities of these substances are useful for promoting growth of *Lactobacillus acidophilus* (ATCC 4963) and certain other lactobacilli used for the production of lactic acid and cottage cheese. Minute quantities of these substances are also effective in promoting growth of higher animals.

The presence of the growth activity of these substances may be determined by microbiological assay with *Lactobacillus acidophilus* (ATCC 4963) using the basal medium set forth in Table 1, as follows:

TABLE 1

| Ingredients | Quantity used per liter of medium (in double strength) |
|---|---|
| Acid-hydrolyzed, norit-treated, vitamin-free casein (Note 1). | 10 g. |
| Trypsin-digested, norit-treated, vitamin-free casein (Note 2). | 5 g. |
| DL-Tryptophane | 0.4 g. |
| L-Cystine | 0.2 g. |
| DL-α-Alanine | 1 g. |
| Glucose | 40 g. |
| Adenine, guanine, xanthine, uracil | 10 mg. each. |
| Thymine, orotic acid | 40 mg. each. |
| Salt A (Note 3) | 20 ml. |
| Salt B (Note 4) | 10 ml. |
| Polysorbate 80 (Tween 80) | 2 ml. |
| Thiamine, pantothenic acid, riboflavin, nicotinic acid. | 2 mg. each. |
| Folic acid, pyridoxal, p-amino-benzoic acid | 1 mg. each. |
| Pyridoxine hydrochloride | 4 mg. |
| Biotin | 10 microg. |
| Vitamin $B_{12}$, lipoic acid | 20 microg. each. |
| Final pH 6.5–6.6 (by adjustment with 10% aqueous solution of sodium hydroxide). | |

NOTE 1.—The acid-hydrolyzed, norit-treated, vitamin-free casein is prepared as follows: 100 gm. of vitamin-free casein (Labco) are refluxed for 8 to 10 hours with 500 ml. of concentrated HCl and 500 ml. of $H_2O$. The Hcl is distilled off under a vacuum, the volume is restored with $H_2O$, and the evaporation in vacuo is repeated. The hydrolyzed casein is dissolved in approximately 800 ml. of $H_2O$ and is adjusted to pH 3.0 with 10% NaOH. It then is filtered and the filtrate is stirred for half an hour at room temperature with 10 gm. of activated carbon (Darco G–60), and filtered again. The filtrate is the material used for the basal medium.

NOTE 2.—This casein digest is prepared as follows: 25 gm. of vitamin-free casein (Labco) are suspended in 250 ml. of 0.8 percent $NaHCO_3$ and incubated under benzene with 0.5 gm. of trypsin for 48 hours. After digestion, the material is autoclaved 15 minutes and filtered. The filtrate is taken to pH 2.0, stirred 1 hour with 10 gm. of amorphous carbon (Norit A) and filtered. The filtrate is the material used for the basal medium.

NOTE 3.—This is a solution of inorganic salts consisting of 25 gm. of potassium monohydrogen phosphate and 25 gm. of potassium dihydrogen phosphate in 250 cc. of water.

NOTE 4.—This is a solution of inorganic salts consisting of 10 gm. of magnesium sulfate heptahydrate, 0.5 gm. of ferrous sulfate heptahydrate and 0.5 gm. of manganese sulfate tetrahydrate dissolved in 250 cc. of water.

The techniques used in connection with the microbiological assay are essentially in accordance with known procedures. Specifically, stock cultures of *Lactobacillus acidophilus* 4963 are maintained at 5° C. in skim milk medium (Bacto dehydrated skim milk, 100 gms. to 1 liter of water), supplemented with 1 percent of enzymatic digest of casein (Bacto Tryptose). Stocks are transferred every six weeks to duplicate tubes one of which becomes the new stock, the other is held for weekly transfer. Inocula for daily use are prepared by suspending 0.1 ml. of a 24 hour culture in 15 ml. of sterile physiological saline followed by a dilution of 0.5 ml. to 15 ml. of saline. One drop of the second saline suspension is used to inoculate each assay tube. Assay tubes are sterilized at 120° C. for 12 to 15 minutes. Volumes of 10 ml. of the medium of Table 1 are routinely used. Incubation period is 24 hours at 37°. The extent of bacterial growth is determined turbidimetrically with a photoelectric colorimeter (Klett-Summerson).

The growth activity of these substances is measured in terms of "units." One-half maximal growth of *Lactobacillus acidophilus* 4963 is obtained with 0.0005 unit of growth activity per ml. of solution under the assay condition described.

In accordance with this invention, β,δ-dihydroxy-β-methylvaleric acid and the lactone, amides and salts of such acid, are prepared from dried distillers solubles. The details of the preparation of these substances, their properties, and some of their uses, are described in the following examples, which are illustrative, and are not to be considered as limiting the invention.

*Example 1*

This example describes a method for preparing the lactone of β,δ-dihydroxy-β-methylvaleric acid from dried distillers solubles.

To one hundred gallons of methanol was added two hundred pounds of dried distillers solubles. The mixture was stirred at 60° C. for one hour under reflux. The mixture was filtered, and the filtrate collected. It measured ninety gallons and contained approximately thirty-six kilograms of soluble solids as determined by drying an aliquot.

The residue was then treated with one hundred gallons of methanol in exactly the same manner. The collected filtrate from the second treatment measured ninety gallons and contained approximately nine kilograms of soluble solids.

The two filtrates were combined and concentrated to twenty gallons. Ten gallons of water was added and the resulting mixture concentrated to twenty gallons in order to remove most of the methanol. A second batch of two hundred pounds of distillers solubles was processed in the same manner as outlined. The filtrate from the first methanol solution measured eighty-five gallons and contained approximately thirty-five kilograms of soluble solids. The filtrate from the second methanol solution measured eighty-five gallons and contained approximately nine kilograms of soluble solids. The two filtrates were combined, concentrated to twenty gallons, then ten gallons of water added and the mixture concentrated to twenty gallons.

The twenty gallon aqueous residues from the two batches were combined and diluted with twenty gallons of water. This mixture was added to the receiver of a continuous liquid-liquid extractor, which already contained twenty gallons of chloroform. Fifty gallons of chloroform were added to the boiler and the solution was continuously boiled for sixteen hours. At the end of this time the chloroform was removed from the boiling pot and concentrated to ten gallons.

The ten gallons of chloroform solution was extracted with five ten-gallon portions of fifty percent methanol (one volume of methanol to one volume of water). The five fifty-percent methanol extracts were combined and evaporated to five gallons, and upon transfer to other equipment, was evaporated to four liters. The solids amounted to 695 g.

Two other batches (3 and 4), were prepared in exactly the same manner as these batches 1 and 2, and the solids pattern was similar. These two batches 3 and 4 were combined and extracted with chloroform under identical circumstances, and the chloroform after evaporation was extracted with fifty percent methanol. After concentration in the same manner as done with batches 1 and 2, the volume was four liters and the total solids measured 1120 g.

Ninety percent of the material from the four batches was combined, giving a volume of 7,770 ml. and containing 1456.9 grams of soluble solids. Upon microbiological assay in manner described, the material was found to possess 231,000 units of microbiological activity, or a potency of 0.16 unit/mg.

This solution was poured onto a column of 75 lbs. of adsorbing agent prepared by mixing one part of fuller's earth (Superfiltrol) with two parts of diatomaceous earth (Celite). When the column had taken up the above solution, fractional elution was accomplished by the addition of water. Separate eluate fractions or cuts from the column were collected with the following volumes and microbiological activity:

| Cut | Volume, ml. | Units of activity/cut |
|---|---|---|
| No. 1 | 43,600 | 218,000 |
| No. 2 | 20,000 | 14,000 |
| No. 3 | 10,000 | 0 |

Cuts 1 and 2 containing all the activity applied to the column were reduced to a small volume in a low temperature vacuum concentrator. This concentrate was neutralized to pH 7 by the addition of 10% sodium hydroxide solution, and then filtered. To the clear filtrate was added 4 volumes of ethanol. The mixture was allowed to stand at 5° C. for 3 days. The precipitate that formed was filtered off and the alcoholic solution was reduced to a volume of 1420 ml. in the vacuum concentrator.

The 1420 ml. of concentrate contained 180,000 units of microbiological activity, and 862 gms. of dry matter, or a potency of 0.21 unit/mg.

This solution was divided into two equal portions of 710 ml. each. Each portion was poured onto a chromatographic column containing 10,000 gms. of a sulfonic acid type cation exchange resin (Amberlite IR–120) previously converted to the hydrogen cycle by washing with 2 N hydrochloric acid and then with water until the pH of the effluent rose to about 6. When the resin had taken up the solution applied, it was fractionally eluted with water. Cuts of 1,000 ml. were collected and individually analyzed for microbiological activity and dry matter. Cuts 5 through 9 from each column were found to contain the major portion of the microbiological activity. These cuts accounted for 166,000 units of microbiological activity out of 180,000 units applied to the column and were present in 374 gms. of dry matter, giving a potency of 0.44 unit/mg. The 10 liters of concentrate were reduced to a small volume in the vacuum concentrator and neutralized to pH 7 with NaOH.

This neutral solution, with a volume of 495 ml., was applied to a chromatographic column containing 2000 gms. of a strong anion exchange resin (Dowex–1), freshly prepared on the hydroxy cycle by washing with 10% NaOH solution and then with distilled water until the pH of the effluent was less than 8. When the column had taken up the solution applied, it was washed with water until the pH of the eluate was 7. Fractional elution then was accomplished using 0.05 N formic acid. Cuts of 1,000 ml. were collected. The major portion of the activity applied to the column was collected in cuts 6 through 11, where 142,000 units weer obtained.

These cuts 6 through 11 were reduced to a small volume in the vacuum concentrator and the solution neutralized to pH 7 with NaOH. The solution, now in a volume of 210 ml., was applied to a similary prepared chromatographic column, washed with water and eluted as before. The major portion of the activity applied to this column was now found in cuts 6 through 12.

These cuts 6 through 12 were reduced to a volume of less than 75 ml. in the vacuum concentrator. This solution, containing 144,000 units by microbiological assay, was then subject to countercurrent distribution in a system where the two phases were formed from the equilibration of 3 parts chloroform, 4 parts ethanol and 4 parts water. The apparatus used was a 15 unit Craig countercurrent apparatus, as described in Analytical Chemistry, vol. 23, pages 1236–1244. When the first mobile phase had reached the discharge end of the apparatus, it was collected in an individual container, and as subsequent mobile phases reached the discharge end of the apparatus, they were individually collected in separate containers until a total of 30 fractions had been collected. These separate fractions were assayed for microbiological activity.

Activity was encountered according to a normal distribution curve with peak activity in fraction 15. Of the 144,000 units of activity distributed, 134,000 units of activity were encountered in the separate fractions. Most of the contaminating extraneous dry matter was found in fractions 1–5. Fractions 6–20 were combined, reduced to a small volume in the vacuum concentrator, and lyophilized to dryness. Microbiological assay showed the presence of 111,000 units of activity in 8.40 gms. of dry matter, or a potency of 13.2 units/mg.

The material was then introduced to a similar countercurrent apparatus, but having a total of 200 tubes or units. The solvent mixture was the same as before, and was prepared by combining the three solvents and allowing them to equilibrate into two liquid phases. The apparatus was arranged to run with ten ml. of each phase in each tube.

The total quantity of 8.4 grams of concentrate was dissolved by adding 50 ml. of each phase of the equilibrated solvent mixture, and the resulting solution was loaded into five adjacent tubes at the beginning of the apparatus. The remaining tubes were loaded with only the lower phase of the solvent system.

The distribution was carried through 265 transfers; each was preceded by the usual equilibration by shaking, and separation of phases; a 10 ml. portion of fresh upper phase was added to the first tube after each transfer, according to the usual technique. The effluent from the apparatus was collected in a single container and discarded.

The contents of the 200 tubes of the apparatus were then combined by groups of five and assayed for potency by the methods herein described.

The combined tube contents from tubes 131–135 and tubes 136–140 showed the highest potency. The solvents were removed from each of these two groups by evaporation under reduced pressure. The two groups contained respectively 14,700 units; wt. 247 mg. (potency 59.5 units/mg.); and 16,700 units; wt. 224 mg. (potency 74.5 units/mg.).

The solvent-free material from these tubes was combined with other similar material obtained by a repetition of these techniques, providing a total of approximately 106,600 units (wt. 1769 mg.; avg. potency, 60 units/mg.).

This composite material was subjected to countercurrent distribution by the repetition of the procedure described, using the 200 tube apparatus referred to. Tubes 2 and 3 were loaded with the solute. After 37 transfers had been made, the contents of tubes 1–11 inclusive and 33–42 were removed to eliminate emulsion-producing but relatively inactive materials. These tubes were refilled with fresh solvent phases and distribution was continued until a total of 299 transfers had been made. The effluent from the apparatus was collected and held for recycling in the processing of another batch. The contents of tubes 121 through 180 were removed in combination of fives and assayed for potency. The material of greatest potency was found in tubes 141–165, as follows: Tubes 141–145, 17,900 units, wt. 209 mg., potency 85.7 units/mg.; tubes 146–150, 20,300 units, wt. 223.6 mg., potency 91 units/mg.; tubes 151–155, 22,700 units, wt. 205 mg., potency 110 units/mg.; tubes 156–160, 14,500 units, wt. 160.2 mg., potency 91 units/mg.; and tubes 161–165, 10,200 units, wt. 107.5 mg., potency 95 units/mg.

The material from tubes 141–165 inclusive was combined and the solvents removed by evaporation under reduced pressure. The resulting material had a weight of 905 mg. and activity of 85,600 units, and a calculated average potency of 94 units/mg.

This material was subjected to countercurrent distribution in the same manner as described, and using the 200 tube apparatus referred to. The material was initially loaded into tubes 3 and 4. After 40 transfers were made, the contents of tubes 1–8 inclusive were removed, and replaced by fresh solvents in order to eliminate emulsion-producing materials.

After 297 total transfers were made, the contents of the first 100 tubes were removed and replaced with fresh solvent, filling with both upper and lower layers. The effluent up to this point was collected and held for recycling with a later batch. The introduction of fresh solvent into the apparatus was now discontinued and the discharge end of the apparatus was connected to the input end. Operation of the apparatus was resumed until a total of 600 transfers had been made. Then the contents of tubes 1 through 50 and 151 through 200 were removed and fresh solvent phases were inserted therein. The contents of tubes 51–150 were not disturbed.

Operation was then continued for another 600 transfers (to a total of 1200 transfers). The contents of tubes 130 to 149 inclusive were combined. The contents of tubes 150–199 were removed in groups of five. The material of highest potency occurred in these fractions, as indicated in Table 2, as follows:

TABLE 2

| From tubes Nos. — | Total units | Total wt., mg. | Potency, units/mg. |
|---|---|---|---|
| 130–149 | 12,000 | 104 | 115 |
| 150–154 | 5,700 | 39.7 | 143 |
| 155–159 | 6,300 | 47.4 | 133 |
| 160–164 | 6,600 | 50.9 | 130 |
| 165–169 | 6,100 | 50.5 | 121 |
| 170–174 | 4,700 | 39.4 | 119 |
| 175–179 | 5,100 | 42.3 | 120 |
| 180–184 | 3,100 | 28.9 | 107 |
| 185–189 | 2,600 | 28.4 | 92 |
| 190–194 | 1,200 | 22.5 | 53 |
| 195–199 | 730 | 17.9 | 40 |

The fractions from tubes 150 through 179 inclusive were combined and subjected to another countercurrent distribution, using the same solvent system and apparatus. A total of 100 transfers was made in this distribution.

Combinations of two tubes were made, and assayed microbially with results as shown in Table 3, as follows:

TABLE 3

| From tubes Nos. — | Total units | Total wt., mg. | Potency, units/mg. |
|---|---|---|---|
| 37–38 | 220 | 2.1 | 104 |
| 42–43 | 1,190 | 9.9 | 120 |
| 45–46 | 2,210 | 16.9 | 131 |
| 47–48 | 3,170 | 21.4 | 148 |
| 50–51 | 3,770 | 27.7 | 136 |
| 52–53 | 3,560 | 26.3 | 135 |
| 54–55 | 3,190 | 25.8 | 123 |
| 57–58 | 2,760 | 18.6 | 148 |
| 59–60 | 1,550 | 13.9 | 111 |
| 62–63 | 760 | 7.5 | 101 |

The contents of tubes 45 to 58 inclusive were combined and the solvents removed at reduced pressure. The resulting product was a clear, nearly colorless oil which weighed 150 mg. and was levo-rotatory. It was highly active in the microbiological assay, having a potency of about 140 units/mg. A potentiometric titration gave a pK value of 4.3 and an equivalent weight of 128. This product was found to be the lactone of $\beta$-$\delta$-dihydroxy-$\beta$-methylvaleric acid. This lactone, represented by the following formula, is substantially devoid of free acid:

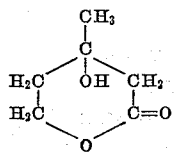

Example 2

This example describes a method for preparing $\beta,\delta$-dihydroxy-$\beta$-methylvaleric acid.

When the lactone prepared as described in Example 1 is dissolved in water and allowed to stand at room temperature, there is formed an equilibrium mixture of the lactone and the free acid. This acid is represented by the following formula:

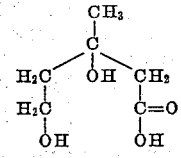

Example 3

This example describes a method for preparing the barium salt of $\beta,\delta$-dihydroxy-$\beta$-methylvaleric acid, a solid derivative of such acid.

100 mg. of the material prepared as described in Example 1 and having a potency of 100 units/mg. was dissolved in 5 ml. of 0.1 normal barium hydroxide solution and heated at 100° C. for 30 minutes. The solution was saturated with carbon dioxide, which precipitated excess barium ion as barium carbonate. The precipitate was filtered off and washed with a little water. The filtrate and washings were evaporated at reduced pressure to a solution of about 1 ml. This solution was diluted with acetone to give a slightly yellow oil which solidified when triturated with acetone. This precipitate was purified by dissolving it in 1 ml. of methanol, diluting with 2 ml. of ethanol then with acetone until a solid precipitate formed. The liquid was decanted and the solid barium salt remaining was washed with acetone to give a nearly white solid, weighing 88 mg., and represented by the following formula:

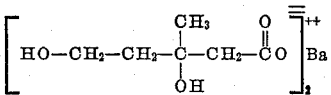

Analysis.—Calculated for $C_{12}H_{22}O_8Ba$: Ba, 31.8. Found: Ba, 35.2.

Example 4

This example describes a method for preparing the benzhydrylamide of $\beta,\delta$-dihydroxy-$\beta$-methylvaleric acid, a crystalline derivative of such acid.

59 mg. of material prepared as described in Example 1 and having a potency of 70 units/mg. was mixed with about 250 mg. of benzhydrylamine (free base). The mixture was heated at 100° C. for one hour in a flask equipped with a drying tube. The reaction mixture was dissolved in 6 ml. of chloroform and the excess base removed by washing with 0.1 N hydrochloric acid to form benzhydrylamine hydrochloride, which is more soluble in water. The mixture was then washed with water until the water extract was nearly neutral. The chloroform solution was evaporated at reduced pressure, leaving a yellow oil weighing 71 mg.

The yellow oil was dissolved in hot benzene and the solution diluted with petroleum ether (Skellysolve C) until slightly cloudy. On standing, a crystalline precipitate was formed. This precipitate was recrystallized in the same manner, and the resulting crystals had a melting point of 92–93° C.

The material was the benzhydrylamide of $\beta,\delta$-dihydroxy-$\beta$-methylvaleric acid, represented by the following formula:

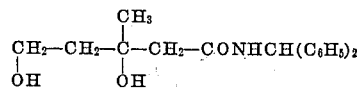

Upon analysis for $C_{19}H_{23}NO_3$: Calculated.—C, 72.82; H, 7.40; N, 4.47. Found.—C, 73.12; H, 6.51; N, 4.71.

This amide was levo-rotatory, its $[\alpha]_D^{20}$ being equal to $-2.0°$ (with c.=20 milligrams per ml. in ethanol).

*Example 5*

This example describes a method for preparing the benzhydrylamide acetate of $\beta,\delta$-dihydroxy-$\beta$-methylvaleric acid, another crystalline derivative of such acid.

50 mg. of the benzhydrylamide prepared as described in Example 4 was dissolved in 0.5 ml. of pyridine. 0.3 ml. of acetic anhydride was added, and the mixture heated at 60° for 30 minutes. The excess reagents were evaporated at reduced pressure, leaving the product as an oil, which crystallized on standing. The product was purified by recrystallization from a mixture of benzene and petroleum ether (Skellysolve C), and the resulting crystals (colorless), had a melting point of 104–105° C.

The material was $\delta$-acetoxy-$\beta$-hydroxy-$\beta$-methylvaleric benzhydrylamide, represented by the following formula:

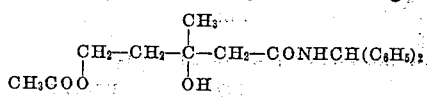

Upon analysis for $C_{21}H_{25}NO_4$: Calculated.—C. 70.97; H, 7.09; acetyl 12.1%. Found.—C. 70.70; 70.80; H, 7.09; 6.87; acetyl 11.4%.

This acetate was dextro-rotatory, its $[\alpha]_D^{20}$ being equal to $+1.6°$ (with c.=45 milligrams per ml. in ethanol).

*Example 6*

This example describes a method for preparing an organic salt of $\beta,\delta$-dihydroxy-$\beta$-methylvaleric acid which is another crystalline derivative of such acid.

100 mg. of the lactone of $\beta$-$\delta$-dihydroxy-$\beta$-methylvaleric acid prepared as described in Example 1 is mixed with about 100 mg. of dibenzylethylenediamine (free base) in 1 ml. of water and the mixture heated at 100° C. for five to ten minutes. The solution is concentrated under vacuum, leaving a moist, crystalline mass. The material is recrystallized from ethyl acetate, and again from acetone. The resulting crystalline product is the dibenzylethylene-diamine salt of $\beta$-$\delta$-dihydroxy-$\beta$-methylvaleric acid, represented by the following formula:

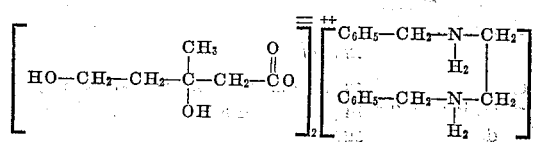

*Example 7*

This example describes the ability of these substances to increase the lactic acid production of organisms used for the production of lactic acid and cottage cheese.

A strain of *Lactobacillus acidophilus* (ATCC 4693) when grown at 37° C. for 40 hours in the basal medium described in Table 1, produced 10 milliequivalents of lactic acid per liter of medium.

The same strain, when grown under the same conditions except that the medium included material prepared as described in Example 1 to the extent of 0.005 unit of potency per milliliter of medium, produced 30 milliequivalents of lactic acid per liter of medium.

In a similar manner the growth and lactic acid production of the following microorganisms are stimulated by material prepared as described in Example 1:

(a) *L. bifidus* (Tomarelli et al., 1949)
(b) *L. bulgaricus* O9 (ATCC 10812)
(c) *L. bulgaricus* (ATCC 7993 and 799)
(d) *Thermobacter acidolphilus* R26 (ATCC 11506)

When either (a) or (d) is used, desoxyribonucleic acid or a desoxyribose-containing derivative is added to the medium.

When either (b) or (c) is used, the medium is supplemented with pantetheine.

*Example 8*

This example describes the ability of these substances to promote growth in experimental mice.

Male albino mice of the Swiss-Webster strain, averaging 10 gms. in weight, were placed on a basal diet composed of all the major foodstuffs, vitamins and minerals that are known to be necessary for optimal growth of mice. This basal diet included in addition two substances as follows: (i) succinylsulfathiazole, to depress the growth of microflora in the intestinal tract of the mice so as to inhibit possible synthesis of unknown growth factors in the intestinal tract, and (ii) iodinated casein, which, having thyroid-like activity, increases the tissue-building requirements of the animals.

This basal diet was composed of the ingredients as set forth in Table 4 as follows:

TABLE 4.—BASAL DIET FOR MOUSE

| Ingredient | Amount of Total Mixture, percent |
| --- | --- |
| Dextrin | 56.3 |
| Casein (Vitamin-free, General Biochemicals Inc.) | 20.0 |
| Fat (Primex) | 10.0 |
| Salt Mixture (Note 1) | 4.0 |
| Cellulose (Celluflour, Chicago Dietetic Supply Co.) | 2.0 |
| Linseed Oil | 1.5 |
| Choline Chloride | 0.2 |
| Succinylsulfathiazole | 2.0 |
| Iodinated casein (Protamone, Cerophyl Laboratories) | 4.0 |
| Vitamin Mixture (Note 2) | |

NOTE.—This is a mixture of the following salts in the following amounts:

| | Gms. |
| --- | --- |
| NaCl | 292.5 |
| $KH_2PO_4$ | 816.6 |
| $MgSO_4$ | 120.3 |
| $CaCO_3$ | 800.8 |
| $FeSO_4.7H_2O$ | 56.6 |
| KI | 1.66 |
| $MnSO_4.2H_2O$ | 9.35 |
| $ZnCl_2$ | 0.5452 |
| $CuSO_4.5H_2O$ | 0.9988 |
| $CoCl_2.6H_2O$ | 0.0476 |

NOTE 2.—This mixture provides the following vitamins in the amount indicated, for each 100 grams of basal diet:

| | | |
| --- | --- | --- |
| Alpha-tocopherol | mg | 4 |
| Vitamin A | USP units | 900 |
| Vitamin D | USP units | 180 |
| 2-methyl-1,4-naphthoquinone diacetate | mg | 1 |
| Thiamin hydrochloride | mg | 0.8 |
| Riboflavin | mg | 16 |
| Pyridoxine hydrochloride | mg | 0.8 |
| Niacin | mg | 4.0 |
| Calcium pantothenate | mg | 4.4 |
| Para-aminobenzoic acid | mg | 4.0 |
| Choline chloride | mg | 200. |
| Inositol | mg | 20. |
| Folic acid | mg | 0.2 |
| Biotin | mg | 0.02 |
| Vitamin $B_{12}$ | mg | 0.03 |

Control mice received the diet set forth in Table 4 over a period of 12 days. Other mice received the same diet supplemented by mixing in the diet, material prepared as described in Example 1, to the extent of 20 units per 100 grams of diet.

Those mice which received only the basal diet gained an average of 5.97 grams in weight. Those mice which received the supplemented diet gained an average of 8.09 grams in weight. This was a gain over the controls of 2.12 grams, or an increase of 35%.

*Example 9*

This example describes the ability of these substances to promote growth in chickens.

Female New Hampshire chicks were placed on a basal diet when 1 day old. When 4 days old they were individually weighed and grouped. Their average weight at this time was 47 grams. Control chicks received the basal diet, while other chicks received the same diet supplemented by mixing in the diet, material prepared as described in Example 1 having a potency of 0.19 unit per milligram. To each kilogram of diet was added 8 ml. of solution containing 0.56 gram of solids having a total activity of 143 units.

The basal diet for the chicks was composed of the ingredients as set forth in Table 5 as follows:

TABLE 5.—BASAL DIET FOR CHICKS

| Ingredient | Amount of Total Mixture, percent |
|---|---|
| Yellow corn meal | 58.2 |
| Soy bean meal (44% Protein) | 32.0 |
| Enzymatically hydrolyzed casein (NZ Amine) | 5.0 |
| Steamed bone meal | 2.0 |
| Ground limestone | 1.5 |
| Sodium chloride | 0.5 |
| Choline chloride dry mix (25% choline) | 0.4 |
| Vitamin A & D Premix (Viadex) | 0.2 |
| dl-Methionine | 0.1 |
| Manganese sulfate | 0.02 |
| Inositol | 0.05 |
| Para-aminobenzoic acid | 0.015 |
| Niacin | 0.002 |
| Calcium pantothenate | 0.0015 |
| Pyridoxine hydrochloride | 0.0005 |
| Riboflavin | 0.0005 |
| Thiamin hydrochloride | 0.00025 |
| Menadione | 0.00005 |
| Biotin | 0.0000125 |
| Vitamin B$_{12}$ | 0.000005 |
| Procaine penicillin | 0.001 |

When the supplement is added to the diet, it is added in place of an equal weight of the yellow corn meal.

When the chicks were 7 days old, they were reweighed. The experiment was terminated when the chicks were 22 days old. Their weight at that time was compared with their weight when 7 days old. The increase in weight of the chicks receiving the supplemented diet exceeded that for the control chicks by 8 percent.

What is claimed is:

1. A compound of the group consisting of (i) β-δ-dihydroxy-β-methylvaleric acid, (ii) the delta lactone of said acid, (iii) an alkali metal salt of said acid, (iv) an alkaline earth metal salt of said acid, (v) the dibenzylethylenediamine salt of said acid, (vi) the benzhydrylamide of said acid and (vii) δ-acetoxy-β-hydroxy-β-methylvaleric benzhydrylamide.

2. β,δ-Dihydroxy-β-methylvaleric acid.

3. β-Hydroxy-β-methyl-δ-valerolactone.

4. The barium salt of β,δ-dihydroxy-β-methylvaleric acid.

5. The dibenzylethylenediamine salt of β,δ-dihydroxy-β-methylvaleric acid.

6. The benzhydrylamide of β,δ-dihydroxy-β-methylvaleric acid.

7. δ-acetoxy-β-hydroxy-β-methylvaleric benzhydrylamide.

8. A composition for promoting the growth of farm animals comprising a compound selected from the group set forth in claim 1, distributed in a nutrient diet for the animal in a concentration not less than 50 units per kilogram and constituting less than 1 percent of the weight of the diet.

9. A method for promoting the growth of farm animals comprising introducing orally to them a compound selected from the group set forth in claim 1, in an amount less than 1 percent by weight of the diet consumed but at a rate not less than 50 units per kilogram of the diet consumed.

References Cited in the file of this patent

UNITED STATES PATENTS

| 2,526,702 | Smith | Oct. 24, 1950 |
| 2,576,901 | Jong | Nov. 27, 1951 |
| 2,623,824 | Gaudry | Dec. 30, 1952 |

FOREIGN PATENTS

| 281,947 | Switzerland | July 16, 1952 |

OTHER REFERENCES

Chem. Abst., vol. 48, 8871(h) (1954).
Barnett et al.: Biochem. J., vol. 36, pp. 357–63 (1942).
Adams et al.: Org. Reactions, vol. 1, p. 27, Wiley and Sons, N. Y. (1942).